United States Patent Office 2,925,407

Patented Feb. 16, 1960

2,925,407

CURABLE COMPOSITION CONTAINING CONJUGATED DIENE POLYMERS USING A FREE RADICAL GENERATOR AND A FREE RADICAL ACCEPTOR, AND PRODUCT THEREOF

Earl J. Goldberg, Wilmington, Del., assignor to E. I. du Pont de Nemours and Company, Wilmington, Del., a corporation of Delaware

**No Drawing. Application May 28, 1956
Serial No. 587,495**

11 Claims. (Cl. 260—83.3)

This invention relates to high molecular weight, substantially unsaturated polymers prepared from conjugated diolefines, and more particularly to a curing process for these polymers involving the use of free radical generators such as organic peroxides and free radical acceptors such as bismaleimides.

The curing of substantially unsaturated polymers prepared from conjugated diolefines by means of the application of a sulfur type cure or organic peroxides has been known. The peroxide type method has not proved to be entirely satisfactory in view of the fact that peroxides sometimes cause degradation of the polymeric chain and, in addition, relatively large amounts of peroxide are needed. It would be highly desirable to be able to provide a process which would permit the use of a much lower concentration of peroxide and reduce the undesirable side reactions associated with the peroxide type cure.

It is an object of the present invention to provide a process for curing high molecular weight, substantially unsaturated polymers prepared from conjugated diolefines. A further object is to provide a process for curing high molecular weight, substantially unsaturated polymers prepared from conjugated diolefines involving the use of free radical generators and free radical acceptors. A still further object is to provide a high molecular weight, substantially unsaturated polymer prepared from conjugated diolefines having incorporated therewith a free radical generator and a free radical acceptor. Other objects will appear hereinafter.

These and other objects of the following invention are accomplished by a process for curing high molecular weight, substantially unsaturated polymers prepared from conjugated diolefines which comprises incorporating with said polymers from 0.25 to 3% by weight of a free radical generator and from 0.5 to 6% by weight of a free radical acceptor and heating the compounded polymer to a temperature of about 50 to 150° C. until the polymer is cured.

While this invention does not depend on any particular theory of how the curing process is effected, it is believed that the free radical generators liberate and decompose under the curing conditions and form free radicals which attack the unsaturated polymers. Representative free radical generators include organic peroxides and azobisaliphatic nitriles. The organic peroxides include compounds such as dicumyl peroxide, dibenzoyl peroxide, di-tert-butyl peroxide, cumene hydroperoxide, methyl ethyl ketone peroxide, tert-butyl perbenzoate and di-N-methyl-tert-butyl percarbamate. Representative azobisaliphatic nitriles include compounds such as 1,1′-azobisisobutyronitrile, 1,1′-azobis(α-γ-dimethylvaleronitrile) and 1,1′-azobiscyclohexanecarbonitrile.

The free radical acceptors which are used in conjunction with the free radical generators in the process of the present invention are compounds which are capable of reacting with free radicals. Representative acceptors include compounds such as bismaleimides, bisacrylamides and cyclic trisacrylamide. The bismaleimides may be represented by the formula

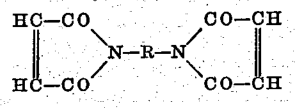

wherein R is an alkylene or an arylene radical. Representative bismaleimides include N,N′-ethylene bismaleimide, N,N′-phenylene bismaleimide and N,N′-pyrenylene bismaleimide. The bisacrylamides which may be used in the process of the present invention may be represented by the formula $$CH_2{=}CH{-}CO{-}NH{-}R{-}NH{-}CO{-}CH{=}CH_2$$

wherein R is an alkylene or an arylene radical. Representative compounds include methylene bisacrylamide and phenylene bisacrylamide. In addition to the bisacrylamides, cyclic trisacrylamide, i.e., hexahydrotrisacryloyl triazine may be used.

In carrying out the process of the present invention, the quantities of free radical generator and free radical acceptor which are used will depend on the degree of cure desired and the reactivity of the polymer being cured. In general, the amount of free radical generator used should be between 0.25 and 3%, while the amount of free radical acceptor used should range from about 0.5 to 6%. Within these ranges, acceptable states of cure are obtained; however, it is to be understood that the particular amounts used may vary widely within these ranges.

The high molecular weight, substantially unsaturated polymers prepared from conjugated diolefines which may be cured according to the process of the present invention include the polymers which contain intralinear C=C unsaturation in the polymeric chain. In general, the polymers which are cured by the process of the present invention have molecular weights of at least 5000 and, for the most part, these polymers are solids; however, it is to be understood that high molecular weight, liquid polymers may also be used. Representative polymers include natural rubber, copolymers of butadiene and styrene, copolymers of isobutylene and isoprene and copolymers of butadiene and acrylonitrile. These polymers are more particular described in the examples.

In carrying out the process of the present invention, it is necessary merely to mix, by standard milling procedures, the free radical generator and the free radical acceptor with the substantially unsaturated polymeric material which is to be cured, and to heat to sufficiently high temperatures to cause decomposition of the free radical generator, which will generally be in the range of about 50 to 150° C. This heating should be continued until a cure is obtained. This temperature range may vary within wide limits depending upon the particular generator, acceptor and polymer being used. However, heating to temperatures of about 50 to 150° C. for from 15 minutes to several hours is usually sufficient.

The following examples will better illustrate the nature of the present invention; however, the invention is not intended to be limited to these examples. Parts are by weight unless otherwise indicated.

*Example 1*

A. A butadiene acrylonitrile copolymer, containing about 30% acrylonitrile, was used in this example. This copolymer is known as Hycar OR-25 and is described in Hycar Technical Newsletter, September 1, 1952.

B. The copolymer of A above was banded on a standard 2″ x 6″ rubber mill and heated to a temperature of about 100 to 110° C. for from 5 to 10 minutes. The roll temperature of the rubber mill was then reduced to from 30 to 40° C. and 0.5 part of dicumyl peroxide per 100 parts of copolymer and 3.0 parts of m-phenylene bismaleimide per 10 parts of copolymer were added and milled in by standard procedures.

The compounded copolymer was then cured in a mold on a standard Preco hydraulic press at 10,000 lbs. platen pressure for 1 hour at 150° C. The compounded stock was then conditioned for a period of 18 hours at 50% relative humidity and then subjected to the Instron tensile testing device at 25° C. An M 100 reading of 160 p.s.i. was obtained.

A control was run wherein 0.5 part of dicumyl peroxide per 100 parts of copolymer was used but no m-phenylene bismaleimide added. The control when tested under the same conditions had an M 100 reading of 86.

*Example 2*

A. A copolymer of butadiene and styrene containing 23.5% bound styrene, which is available as GR–S 1500 and is described in "GR–S and GR–I Synthetic Rubbers," O.S.R., Washington, D.C., May 1, 1953, was used.

B. 100 parts of the copolymer of A above was compounded with 45 parts of high abrasion furnace black and banded on a standard 2" x 6" rubber mill and heated to a temperature of about 100 to 110° C. for from 5 to 10 minutes. The roll temperature of the rubber mill was then reduced to from 30 to 40° C. and 0.5 part of 1,1'-azobiscyclohexane carbonitrile and 2.0 parts of m-phenylene bismaleimide were added and milled in by standard procedures.

The compounded copolymer was then cured in a mold on a standard Preco hydraulic press at 10,000 lbs. platen pressure for 1 hour at 150° C. The compounded stock was then conditioned for a period of 18 hours at 50% relative humidity and then subjected to the Williams tensile testing device. The M 300 Williams S–S reading at 25° C. was 1450.

A control was run wherein 0.5 part of 1,1'-azobiscyclohexane carbonitrile was used but no m-phenylene bismaleimide was added. This control sample did not cure.

*Example 3*

100 parts of the copolymer of butadiene and styrene of Example 2–A was compounded with 45 parts of high abrasion furnace black and banded on a standard 2" x 6" rubber mill and heated to a temperature of about 100 to 110° C. for from 5 to 10 minutes. The roll temperature of the rubber mill was then reduced to from 30 to 40° C. and 0.5 part of dicumyl peroxide and 0.5 part of N,N'-ethylene bismaleimide was added and milled in by standard procedures.

The compounded copolymer was then cured in a mold on a standard Preco hydraulic press at 10,000 lbs. platen pressure for 1 hour at 150° C. The compounded stock was then conditioned for a period of 18 hours at 50% relative humidity and then subjected to the Williams tensile testing device. The M 200 Williams S–S reading at 25° C. was 1090. A control sample was run wherein 0.5 part of dicumyl peroxide per 100 parts of copolymer was used but no N,N'-ethylene bismaleimide added. This control, when tested under the same conditions, had an M 200 reading of 320. Another control sample was run wherein 0.5 part of N,N'-ethylene bismaleimide per 100 parts of copolymer was used but no dicumyl peroxide added. This control, when tested under the same conditions, had an M 200 reading of 120.

*Example 4*

100 parts of the copolymer of butadiene and styrene of Example 2–A was compounded with 45 parts of high abrasion furnace black and 1 part of phenyl-β-naphthylamine. This compounded copolymer was banded on a standard 2" x 6" rubber mill and heated to a temperature of about 100 to 110° C. for from 5 to 10 minutes. The roll temperature of the rubber mill was then reduced to from 30 to 40° C. and 1.0 part of dicumyl peroxide and 5.0 parts of m-phenylene bismaleimide was added and milled in by standard procedures.

The compound copolymer was then cured in a mold on a standard Preco hydraulic press at 10,000 lbs. platen pressure for 1 hour at 150° C. This compounded copolymer exhibited an appreciably higher degree of cure when compared with a control wherein no m-phenylene bismaleimide was used.

*Example 5*

100 parts of natural rubber was compounded with 45 parts of high abrasion furnace black and banded on a standard 2" x 6" rubber mill and heated to a temperature of about 100 to 110° C. for from 5 to 10 minutes. The roll temperature of the rubber mill was then reduced to from 30 to 40° C. and 0.5 part of dicumyl peroxide and 3.0 parts of cyclic trisacrylamide was added and milled in by standard procedures.

The compounded natural rubber was then cured in a mold on a standard Preco hydraulic press at 10,000 lbs. platen pressure for 1 hour at 150° C. The compounded stock was then conditioned for a period of 18 hours at 50% relative humidity and then subjected to the Williams tensile testing device. The M 200 Williams S–S reading at 25° C. was 790.

A control sample was run wherein 0.5 part of dicumyl peroxide per 100 parts of natural rubber was added but no cyclic trisacrylamide. The control, when tested under the same conditions, had an M 200 reading of 450.

The compounded natural rubber containing the dicumyl peroxide and cyclic trisacrylamide of this example and the conrtol, when subjected to the Williams tensile testing device at 70° C., showed M 300 readings of 820 and 470, respectively.

It is readily apparent that the process of the present invention permits the curing of a wide variety of high molecular weight, substantially unsaturated polymers prepared from conjugated diolefines. The polymers which are cured by the process of the present invention may be formed into sheets or films or fibers after incorporation of the free radical acceptor and the free radical generator before heating to cure. These shaped forms may be prepared by extruding the compounded stock through suitable dies. They may also be prepared by dissolving the compounded stock in a volatile solvent and laying down a layer of the solution and allowing the solvent to evaporate or extruding a concentrated solution through a spinneret and the solvent evaporated. The resulting films or fibers are then subjected to heat to cure. The compounded stock may be formed into thin sheets on roller mills and the sheets taken off as unsupported films. If desired, the films may be calendered onto substrates and the composite heated to cure the polymer.

The substantially unsaturated polymers which are cured according to the process of the present invention may be used generally in a similar manner as polymers which have been cured by the known conventional curing procedures; however, the curing process of the present invention yields polymers which tend to be more solvent resistant and higher melting than those cured with peroxide alone.

These cured polymers may be used to form self-supported articles, coating compositions and electrical insulation, and may be employed in the preparation of tires, belts, sponges, etc. It is to be understood that these polymers may be varied by the incorporation of compounding ingredients such as carbon black, pigments, etc.

As many widely different embodiments of this invention may be made without departing from the spirit and scope thereof, it is to be understood that this invention is not limited to the specific embodiments thereof except as defined in the appended claims.

What is claimed is:

1. A composition comprising a high molecular weight, substantially unsaturated polymer prepared from conjugated diolefines, from 0.25 to 3% by weight of a compound selected from the group consisting of organic peroxides and azobisaliphatic nitriles, and from 0.5 to 6% by weight of a compound selected from the group consisting of N,N'-substituted bismaleimides, N,N'-substituted bisacrylamides and cyclic trisacrylamide.

2. A process for curing high molecular weight, substantially unsaturated polymers prepared from conjugated diolefines which comprises incorporating with said polymers (*a*) from 0.25 to 3% by weight of a compound selected from the group consisting of organic peroxides and azobisaliphatic nitriles and (*b*) from 0.5 to 6% by weight of a compound selected from the group consisting of N,N'-substituted bismaleimides, N,N'-substituted bisacrylamides and cyclic trisacrylamide, and heating said polymers to a temperature of about 50 to 150° C. until a cure is obtained.

3. A process for curing a high molecular weight butadiene acrylonitrile copolymer which comprises incorporating with said copolymer from 0.25 to 3% by weight of dicumyl peroxide and from 0.5 to 6% by weight of m-phenylene bismaleimide, and heating to a temperature of about 50 to 150° C. until a cure is obtained.

4. A process for curing a high molecular weight copolymer of butadiene and styrene which comprises incorporating with said copolymer from 0.25 to 3% by weight of 1,1'-azobiscyclohexane carbonitrile and from 0.5 to 6% by weight of m-phenylene bismaleimide and heating to a temperature of about 50 to 150° C. until a cure is obtained.

5. A process for curing high molecular weight natural rubber which comprises incorporating with said rubber from 0.25 to 3% by weight of dicumyl peroxide and from 0.5 to 6% by weight of cyclic trisacrylamide and heating to a temperature of about 50 to 150° C. until a cure is obtained.

6. The composition of claim 1 in the form of a film.

7. The product obtained by the process of claim 2.

8. The product obtained by the process of claim 2 in the form of a film.

9. A process for curing a high molecular weight copolymer of butadiene and styrene which comprises incorporating with said copolymer from 0.25 to 3% by weight of dicumyl peroxide and from 0.5 to 6% by weight of m-phenylene bismaleimide, and heating to a temperature of about 50 to 150° C. until a cure is obtained.

10. A composition comprising a high molecular weight, substantially unsaturated polymer prepared from conjugated diolefines, from 0.5 to 1.0% by weight of a compound selected from the group consisting of organic peroxides and azobisaliphatic nitriles, and from 0.5 to 5.0% by weight of a compound selected from the group consisting of N,N'-substituted bismaleimides, N,N'-substituted bisacrylamides and cyclic trisacrylamide.

11. A process for curing high molecular weight, substantially unsaturated polymers prepared from conjugated diolefines which comprises incorporating with said polymers (*a*) from 0.5 to 1.0% by weight of a compound selected from the group consisting of organic peroxides and azobisaliphatic nitriles and (*b*) from 0.5 to 5.0% by weight of a compound selected from the group consisting of N,N'-substituted bismaleimides, N,N'-substituted bisacrylamides and cyclic trisacrylamide, and heating said polymers to a temperature of about 50 to 150° C. until a cure is obtained.

References Cited in the file of this patent

UNITED STATES PATENTS 2,271,122 Harman -------------- July 27, 1942

OTHER REFERENCES

Lufter: Rubber World, January 1956, pages 511–22.